(12) United States Patent
Kantarek

(10) Patent No.: US 9,898,745 B2
(45) Date of Patent: Feb. 20, 2018

(54) METHODS AND SYSTEMS FOR CONDUCTING RESEARCH ON AN AIRPLANE

(76) Inventor: Jeffrey Kantarek, Chicago, IL (US)

( * ) Notice: Subject to any disclaimer, the term of this patent is extended or adjusted under 35 U.S.C. 154(b) by 1950 days.

(21) Appl. No.: 12/328,445

(22) Filed: Dec. 4, 2008

(65) Prior Publication Data

US 2010/0145765 A1 Jun. 10, 2010

(51) Int. Cl.

| | | |
|---|---|---|
| *G06Q 30/02* | (2012.01) | |
| *G06Q 10/06* | (2012.01) | |
| *G06F 17/30* | (2006.01) | |
| *G06Q 50/00* | (2012.01) | |
| *G06Q 10/00* | (2012.01) | |
| *G06F 3/041* | (2006.01) | |

(52) U.S. Cl.
CPC ......... *G06Q 30/02* (2013.01); *G06Q 10/063* (2013.01); *G06Q 30/0203* (2013.01); *G06Q 30/0217* (2013.01); *G06F 3/041* (2013.01); *G06F 17/30* (2013.01); *G06Q 10/00* (2013.01); *G06Q 50/00* (2013.01)

(58) Field of Classification Search
CPC ...... G06Q 30/02; G06Q 10/063; G06Q 10/00; G06Q 30/00; G06Q 50/00; G06F 17/30; G06F 3/041
USPC ................ 705/7.11, 7.32; 345/173; 707/3, 4
See application file for complete search history.

(56) References Cited

U.S. PATENT DOCUMENTS

| | | | | |
|---|---|---|---|---|
| 5,227,874 | A * | 7/1993 | Von Kohorn | ................ 705/7.32 |
| 5,721,831 | A * | 2/1998 | Waits et al. | ................ 705/36 R |
| 6,201,797 | B1 | 3/2001 | Leuca et al. | |
| 6,249,913 | B1 | 6/2001 | Galipeau et al. | |
| 6,266,815 | B1 * | 7/2001 | Shen et al. | ...................... 725/76 |
| 6,499,027 | B1 * | 12/2002 | Weinberger | |
| 6,561,454 | B1 | 5/2003 | White, III | |
| 6,813,777 | B1 | 11/2004 | Weinberger et al. | |
| 7,020,708 | B2 | 3/2006 | Nelson et al. | |
| 7,028,304 | B1 * | 4/2006 | Weinberger et al. | ......... 719/310 |
| 2001/0032121 | A1 * | 10/2001 | Le | ................... 705/14 |
| 2002/0072955 | A1 * | 6/2002 | Brock | .............. 705/10 |
| 2002/0099605 | A1 * | 7/2002 | Weitzman et al. | ............. 705/14 |
| 2003/0019136 | A1 * | 1/2003 | Whitman | ........................ 40/320 |
| 2003/0195793 | A1 * | 10/2003 | Jain et al. | ....................... 705/10 |
| 2005/0102074 | A1 * | 5/2005 | Kolls | .............................. 701/29 |

(Continued)

OTHER PUBLICATIONS

The effect of incentives in web surveys: application and ethical considerations. Cihan Cobanoglu. University of Delaware. Nesrin Cobanoglu, 2003, International Journal of Market Research vol. 45 Quarter 4, pp. 475-488.*

*Primary Examiner* — Timothy Padot
*Assistant Examiner* — Darlene Garcia-Guerra
(74) *Attorney, Agent, or Firm* — Banner & Witcoff, Ltd.

(57) ABSTRACT

This invention relates to methods and systems for conducting market research, product research, or advertising research. More particularly, travelers are presented with a product and asked to provide feedback regarding the product by completing a survey. Answers to the survey are entered via an input device. Survey answer data is stored in a storage device along with demographic information relating to the traveler and the data is stored. In exchange for completing product research travelers may receive carrier specific rewards or a discount on the cost of travel. Data collected from travelers is collected and sold to corporate sponsors.

7 Claims, 10 Drawing Sheets

(56) References Cited

U.S. PATENT DOCUMENTS

| | | | |
|---|---|---|---|
| 2005/0256616 A1* | 11/2005 | Rhoads | H04L 67/06 701/1 |
| 2005/0264430 A1* | 12/2005 | Zhang et al. | 340/905 |
| 2006/0184583 A1* | 8/2006 | Renton et al. | 707/104.1 |
| 2006/0212328 A1* | 9/2006 | Hoffmire et al. | 705/8 |
| 2007/0011122 A1* | 1/2007 | Hall et al. | 706/21 |
| 2007/0282666 A1* | 12/2007 | Afeyan et al. | 705/10 |
| 2008/0059281 A1* | 3/2008 | Tower et al. | 705/10 |
| 2008/0270218 A1* | 10/2008 | Scott et al. | 705/10 |
| 2008/0288863 A1* | 11/2008 | Bohannon | 715/255 |
| 2008/0294498 A1* | 11/2008 | Adrien et al. | 705/10 |

\* cited by examiner

Business Access Interface (Results of Purchased Polls – Raw Data Results)

METHODS AND SYSTEMS FOR CONDUCTING RESEARCH ON AN AIRPLANE

FIELD

This invention relates to methods and systems for conducting market research, product research, or advertising research. More particularly, travelers are presented with a product while on board an aircraft and asked to provide feedback about the product by completing a survey. The survey may be presented on a graphical user interface that permits a passenger to read and answer questions. Answers to the survey are entered via an input device and stored. Demographic information may also be entered and stored. Survey answer data may be stored in a database associated with demographic information. In exchange for completing product research travelers may receive carrier specific rewards or a discount on the cost of travel. Data collected from travelers is collected and access to the data is provided to a sponsors company.

BACKGROUND

Rising fuel costs have increased the cost of air travel and caused airlines to cut costs and seek new revenue streams in order to achieve profitability. For example, most airlines have stopped providing free meals to passengers and instead sell snacks, meals, and beverages. Airlines add fuel surcharges to ticket prices and charge travelers extra for checking luggage and for aisle or window seats. Many of these new profitability measures, and especially the checked baggage charge, have been unpopular with air travelers.

Conducting market and product research is often costly, inefficient, intrusive, and largely a negative experience for participants and product brands. Consumers dislike telemarketers calling their homes. Mail surveys are lengthy, cumbersome, boring and easily disregarded by recipients. Over time, response rates to mail and telemarketer surveys have eroded. Conducting face to face focus groups is highly costly and time consuming. Conducting a face to face survey requires identifying willing participants for the study and then compensating participants. Conducting market and product research on-line was supposed to avoid the problems with mail, telemarketer, and face to face research. Foremost, on-line research can be conducted quickly and inexpensively. However, results from on-line surveys often do not replicate against the same on-line survey or surveys conducted using other methodology. The lack of replication casts doubts on the reliability, validity, and veracity of on-line surveys.

SUMMARY

The following presents a general summary of aspects of the invention in order to provide a basic understanding of the invention and various features of it. This summary is not intended to limit the scope of the invention in any way, but it simply provides a general overview and context for the more detailed description that follows.

An airline flight provides a captive, typically diverse audience of airline passengers who are likely willing to participate in a research study in exchange for an incentive that will lower their cost of travel. Aspects of the invention relate towards novel methods and systems for conducting market research, product research, or advertising research on an airplane.

An airline (or an intermediary) partners with a sponsor company that desires feedback regarding a product. While on board, airline passengers are provided with a product and asked to provide feedback about the product by completing a survey. In addition to providing the product, a short information piece or advertisement about the product may be shown on one or more display screen on-board the aircraft. In one embodiment, the survey is presented on a touch screen display mounted in a passenger seat. The touch screen includes a graphical user interface that permits a passenger to answer survey questions by selecting an icon. In another embodiment, an input device such as a mouse, stylus, or keyboard may be utilized by passengers to answer survey questions. Demographic information such as age, gender, salary range, city or zip code of residency, etc. relating to the passenger may be also collected and stored. In one embodiment, survey answer data may be stored in a database associated with a passenger's demographic information. In exchange for completing the survey the passenger receives an incentive, for example, frequent flier miles, a free checked baggage voucher, or a discount on future travel.

The airline (or an intermediary) may provide the sponsor company access to all or a portion of the data stored in the database. Storing survey answer data associated with passenger demographic information permits a sponsor company to filter the data according to one or more demographics. For example, a corporate sponsor may filter the data to determine the percentage of females ages 25-34 that reacted favorably or negatively to a particular survey question. Access to the database may be provided via web based applications. The airline (or an intermediary) may charge varying fees depending on what portion of the database is accessed by the sponsor company.

Aspects of the invention also relate to novel systems for conducting market research, product research, or advertising research on an airplane. One aspect of the system is to provide a graphical user interface that allows an airline passenger to answer survey questions. In one embodiment, the graphical user interface is shown on a displayed mounted in an airline seat. The graphical user interface may contain a number of selectable screens with each screen containing one or more survey questions and selectable icons that correspond to a survey answer. The user may answer survey questions by selecting an icon from screen using an input device such as a mouse, keyboard, keypad, or touch screen. The graphical user interface may be generated by a local software application running on hardware, such as a touch screen display and its associated microprocessor, mounted in an airplane. Alternatively, the graphical user interface may be accessible by a passenger via a personal computer over a web browser. A user's answers to survey questions may be stored in a storage device locally situated on an airplane. Preferably, survey answer data is transmitted from the in-plane storage device to one or more remote storage devices either in-flight or after landing. Alternatively, the storage device may be located remotely from an airplane and survey data may be transmitted via a wireless communications network from an airplane to the storage device. The system includes conventional microprocessors, memory (RAM and ROM), and circuitry for controlling the operations of the system.

Demographic information such as age, gender, salary range, city or zip code of the passenger, etc. may be also collected from the passenger and stored in a storage device. Demographic information may be input while on board through an input device. Alternatively, a passenger may create an account prior to a flight using a web-based application and enter demographic information via that application. Another feature of the system is to permit a passenger to access information relating to surveys the passenger completed, incentives earned by the passenger for completing surveys, who has purchased their survey answers, and a sample data set matching what is presented to a sponsor company.

Preferably, demographic information and survey answer data are stored in a database on a remote storage device. Conventional database software such Microsoft Access, Microsoft SQL, PostgreSQL, dBase, MySQL, etc. may be used in forming the database. Another feature of the system permits sponsor companies or others access to the database of survey data and demographic data. A database server is coupled to the storage device and a communications network to permit access to the database. A web browser application is configured to access and interact with the database server via the communications network. The web browser contains a graphical user interface which allows a sponsor company or other party to access survey data and filter survey results by one or more demographic. Survey data filtered by demographic may be presented in textual or graphical format, such as tables, pie charts, bar graphs, or map results. The airline (or an intermediary) may charge sponsor companies or others for access to the database of survey answers and demographic information and the web browser application may include security measures that limit access to only the paid for portions of the database.

Another feature of the invention is the use of the novel system by an airline to collect additional data from passengers that may assist the operations of the airline. The system may also collect passenger data such as number of bags checked, the purpose of the trip (business or pleasure), seat preferences, trip duration, luggage weight, etc. This information may be input by a passenger or retrieved from other airline computer systems. Collecting this data may assist an airline in improving its operations by, for example, providing a more accurate estimate of fuel consumption for a given flight based on a historic data relating to the number of bags checked and their weight by a particular passenger. Airlines may also present customer service surveys using the inventive method or systems described herein.

There has been outlined, rather broadly, the more important features of the invention in order that the detailed description that follows may be better understood, and in order that the present contribution to the art better appreciated. There are, of course, additional features and embodiments of the novel systems and methods of the invention that will be described hereinafter and which will form the subject matter of the claims. Those skilled in the art will appreciated that the conception, upon which this disclosure is based, may readily be utilized as a basis for the designing of other systems and methods for carrying out product and market research. For example, it is contemplated that the methods and systems for conducting market research, product research, or advertising research may also be implemented on trains, buses, or cruise ships.

BRIEF DESCRIPTION OF THE DRAWINGS

A more complete understanding of the present invention and certain advantages thereof may be acquired by referring to the following detailed description in consideration with the accompanying drawings, in which.

The reader is advised that the attached drawings are not necessarily drawn to scale.

DETAILED DESCRIPTION

Figure 1:
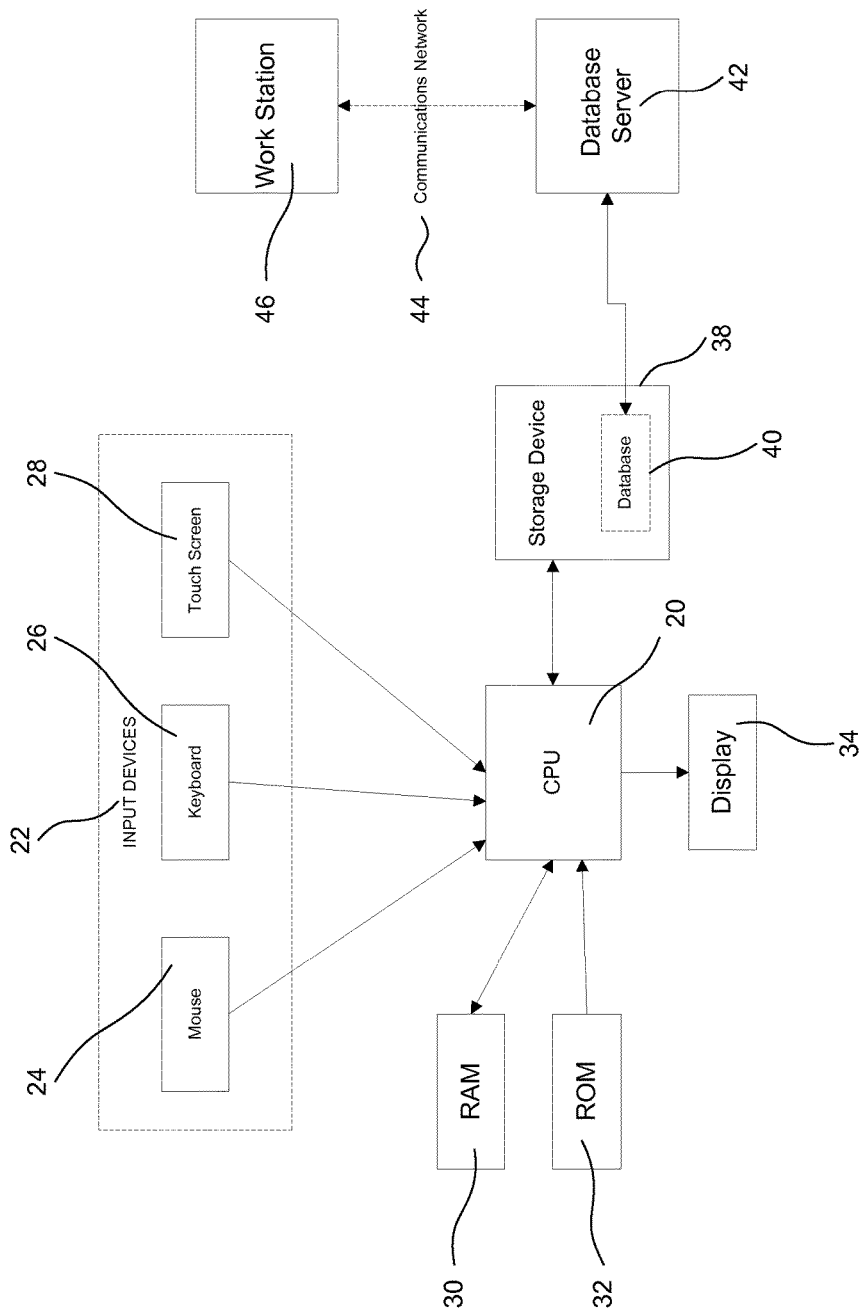
FIG. 1 is a schematic block diagram of the hardware for an exemplary system for conducting market research.

A generalized embodiment of a system for conducting market research on an airplane is shown in FIG. 1. Central processing unit (CPU) 20 is a microprocessor adapted to accept inputs from a variety of hardware components. The microprocessor and hardware components are well-known and commercially available. Random access memory (RAM) 30 and read only memory 32 (ROM) are provided to support the CPU 20 and its operations. One or more input devices 22 are also provided. The input device 22 may be a mouse 24, keyboard 26, or a touch screen 28. The keyboard or mouse may be omitted in certain embodiments where a touch-screen is used as the input device. Other input devices, such as a keypad or remote control, would also be suitable for use in the invention. One or more displays 34 are operatively connected to the CPU 20. The display is preferably a touch screen display mounted in a passenger seat, but the display may additionally be a computer monitor, LCD, or television screen. Most preferably, the display of the invention is existing equipment on the airplane. In a preferred embodiment, each passenger seat is equipped with a display and input device, and most preferably, a touch screen display device. Where a touch screen display device is utilized a touch keyboard interface thereon can be utilized for entering alphanumeric characters.

Display 34 utilizes a graphical user interface to allow users to fill out a survey. A locally installed application may generate the graphical user interface and may also include the programs needed for the CPU to interact with the invention's components and circuitry. In another embodiment, if the aircraft is equipped with WiFi capability, the graphical user interface may be generated by a web-based application using known software, such as Adobe Flash, and provide the programs needed for the CPU to interact with the invention's components and circuitry. Other known software packages, such as Drupal, may be utilized to publish, manage, and organize content in a web framework and to manage data and user accounts in embodiments of the invention. For example, Drupal includes a poll module which enables the creation of surveys and the ability to show survey questions on various screens.

Figure 2:
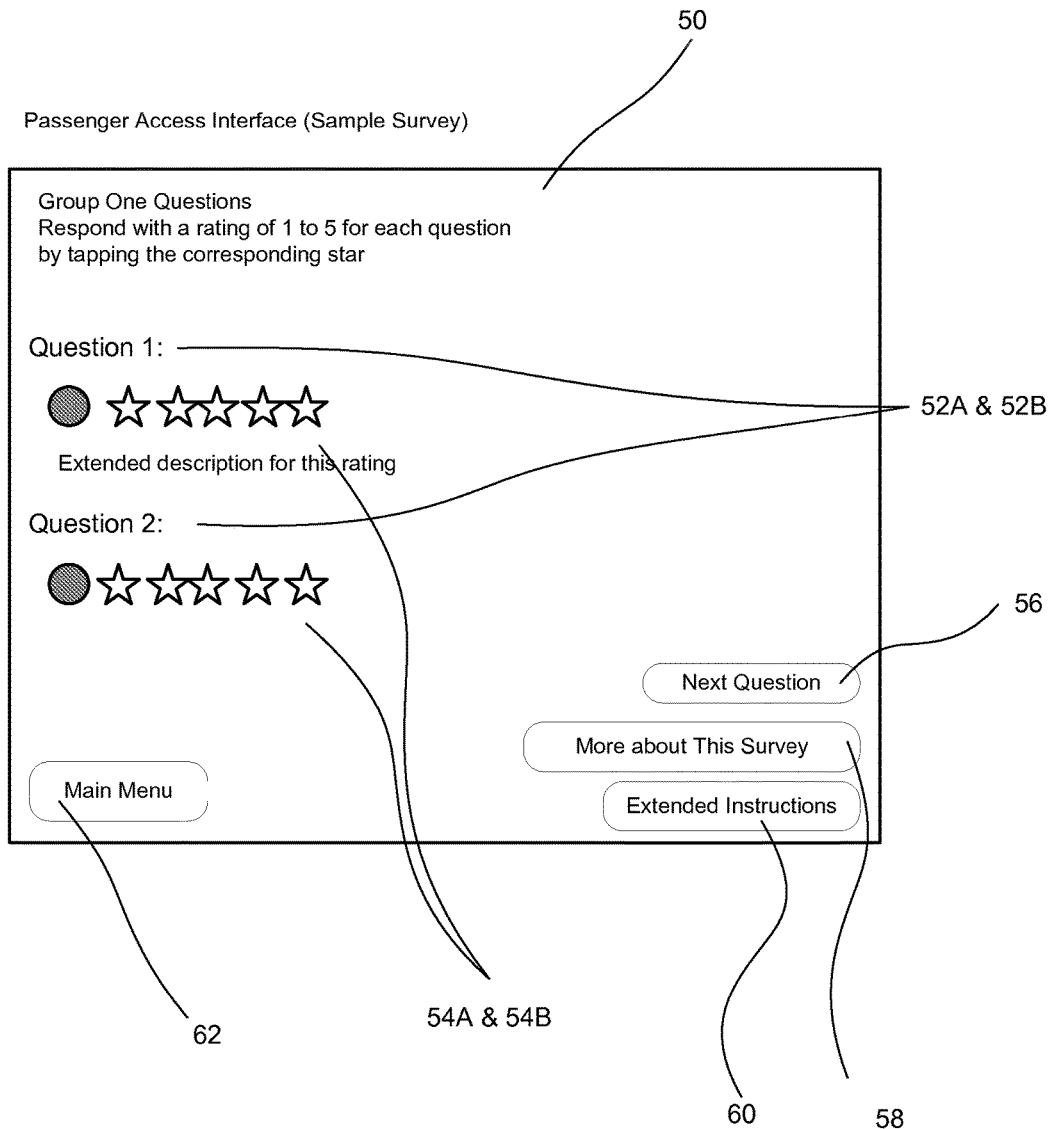
FIG. 2 is a plan view of a graphical user interface screen suitable for displaying survey questions and answers.

FIG. 2 illustrates a touch screen display 50 mounted in a passenger seat and one embodiment of a graphic user interface 51 suitable for use in the invention. One embodiment of the graphical user interface 51 shown in FIG. 2 includes a number of selectable buttons or icons, including "Main Menu" button 62, "Next Question" button 52, "More About the Survey" button 58, and "Extended Instructions" button 60. Selecting "Main Menu" button 62, as the name suggests, will present the main menu screen of the graphical user interface. The "Main Menu" may include one or more surveys that a user may complete during a flight. Selecting the "Next Question" button will cause the CPU to display a new screen on the graphical user interface that contains additional survey questions. Selecting the "More About the Survey" button will display a screen that provides additional information about the survey. For example, in the case of a product survey, additional information about the product such as its ingredients and suggested retail price may be provided. Also, additional information about the company sponsoring the survey may be provided.

Figure 2A:
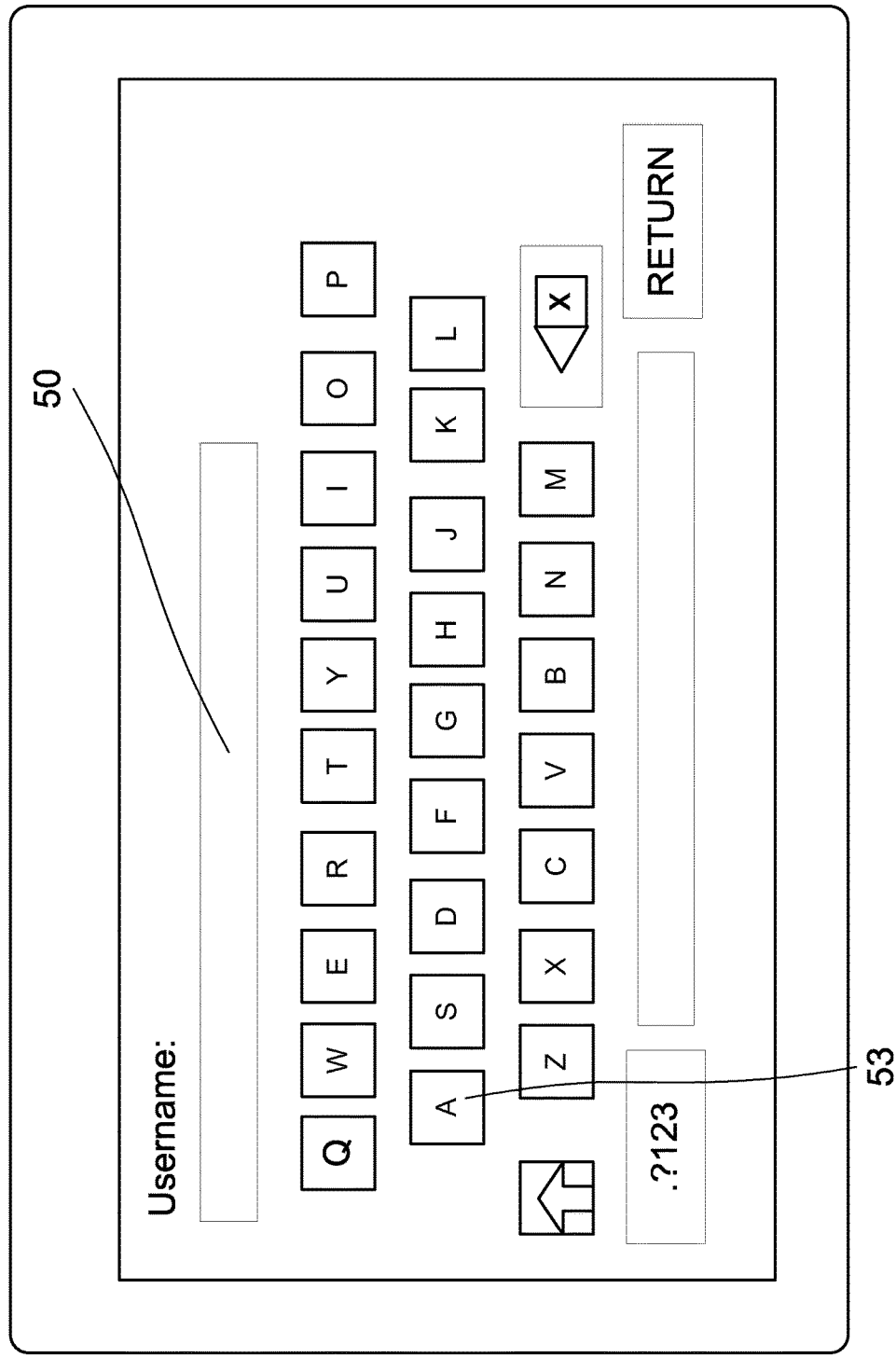
FIG. 2A is a plan view of a graphical user interface screen suitable for displaying an alphanumeric keyboard.

The graphical user interface preferably includes questions 52A and 52B to be answered by a passenger and icons 54A and 54B that correspond to a predetermined answer to a survey question. For example, using the graphical user interface illustrated in FIG. 2, the passenger answers questions 1 and 2 by selecting a star icon corresponding to a rating of 1 to 5 using an input device 22, such as a touch screen 28. While icons 54A and 54B are depicted as stars, other suitable shapes can be utilized. Additionally, instead of providing rating based answers, the graphical user interface may present "Yes," "No" or "True," "False" icons; multiple choice icons such as "Agree," "Somewhat Agree," "Somewhat Disagree, or "Disagree" icons; or permit a user to select multiple answers to a single question. While the preferred embodiment of the graphical user interface includes selectable icons for survey answers, the interface may alternately permit a passenger to answer survey questions via a drop down menu. In another embodiment, a passenger may enter full text answers to survey questions using, for example, an on-screen alphanumeric keyboard 53 as shown in FIG. 2A.

CPU 20 is operatively connected to a storage device 38, which may be a hard drive or other high volume storage medium. Storage device 38 is used to store data corresponding to a passenger's answers to one or more survey questions. When a user selects a survey answer, the input device sends a signal to the CPU and the CPU interprets the signal and directs the storage device 38 to store the passenger's answer to survey question. Storage device 38 may additionally store user account information and demographic information relating to a passenger. Demographic information stored on the storage device may include the passenger's age or age range, birth date, salary or salary range, profession, marital status, city or zip code of residency, ethnicity, weight or weight range, sexual preference, disabilities, attainment, home ownership, employment status, religion, allergies, food preferences (e.g. vegetarian, vegan, etc.), flight origin, flight destination, reason for flying, etc. Preferably, demographic information and passenger survey answer data are stored in a database 40 on the storage device 38. Conventional database software such Microsoft Access, Microsoft SQL, PostgreSQL, dBase, MySQL, etc. may be used in forming the database.

In an alternative implementation, the demographic information and/or user account information may be maintained on one database while a second database holds passenger answer data. The use of segregated databases may be utilized to provide anonymous information to insure that the identity of the user providing survey answers cannot be ascertained by a purchaser of survey answers. Additional safeguards may be implemented to prevent filtering of survey data to a level that would permit a purchaser to ascertain the identity of a survey participant. For example, the system may limit survey data filtered by zip code from being filtered by any other demographic other than gender. Access may be restricted to only the user account and demographic information database or the passenger answer database, as desired.

A database server 42 is operatively connected to the storage device 38 and database 40. The database server 42 is preferably located remotely from said airplane. The database server 42 facilitates access to database 40 containing survey answer data and demographic information. In one embodiment, a corporate sponsor may remotely access the database server via a communications network 44, such as a radio, telephone, or wireless network link, naturally including the Internet. In another embodiment, all or a portion of the survey data and demographic information collected from passengers may be provided to a sponsor company on a portable storage medium, such as a DVD, CD-Rom, hard drive, memory stick, tape, floppy disk, etc. FIG. 1 depicts the communication network 44 operatively connected to a work station 46, which may be a personal computer at a corporate sponsor's place of business. While FIG. 1 shows a single database and single database server, multiple databases and database servers may be utilized if user account information and demographic information is segregated from passenger answer data.

In one embodiment, a web browser based application is configured to generate a user interface on the work station 46 that displays at least some of the survey data and/or demographic information contained in database 40. In another embodiment, work station 46 includes an installed application for interacting with survey and/or demographic information. If an aircraft is equipped with WiFi capability, survey data and/or demographic information may be transmitted over the communications network to a sponsor company and provide near instant feedback or real time feedback and survey results.

Figure 3:
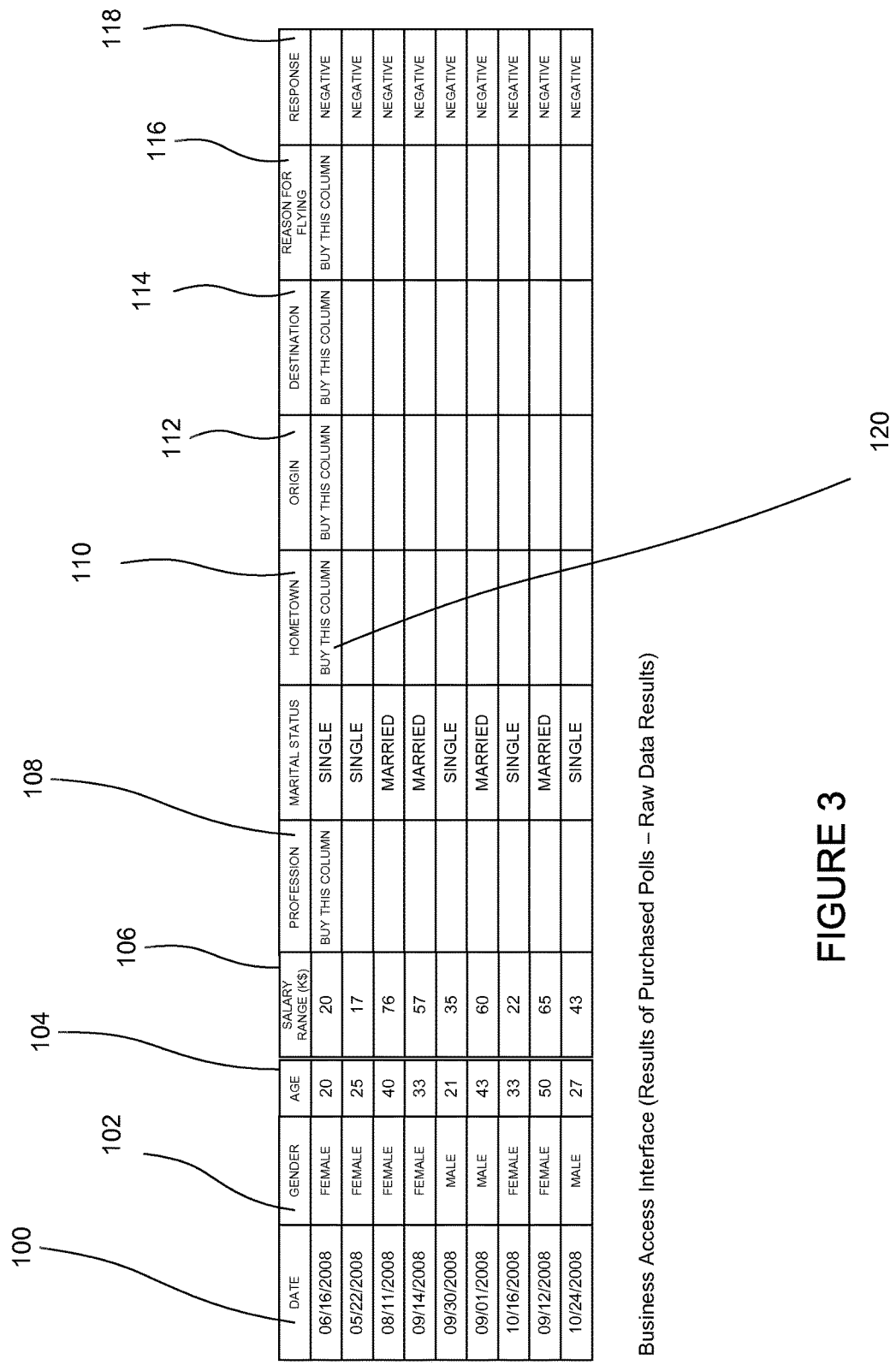
FIG. 3 is a plan view of a user interface screen suitable for presenting survey data and demographic data to a sponsor company.

FIG. 3 depicts one exemplar embodiment of a user interface for displaying survey data. FIG. 3 displays survey answer results in raw format arranged in columns 100-116 corresponding to demographic information or other information about the survey. Airlines may charge for access to the data in the database 40 per demographic. Column 100 contains data regarding the date the survey was completed. Column 102 contains data regarding the passenger's gender. Column 104 contains data regarding the passenger's age. Column 106 contains data regarding the passenger's salary range. Column 108 could be utilized to display information regarding the passenger's profession. Column 118 includes the passenger's response to a survey question, in this case "Negative." As shown in FIG. 3, the particular party accessing the database has not purchased the profession column of survey data. By selecting the "Buy This Column" button 120, the user interface would display profession data in column 108 and charge the user for access to that data.

Figure 4:
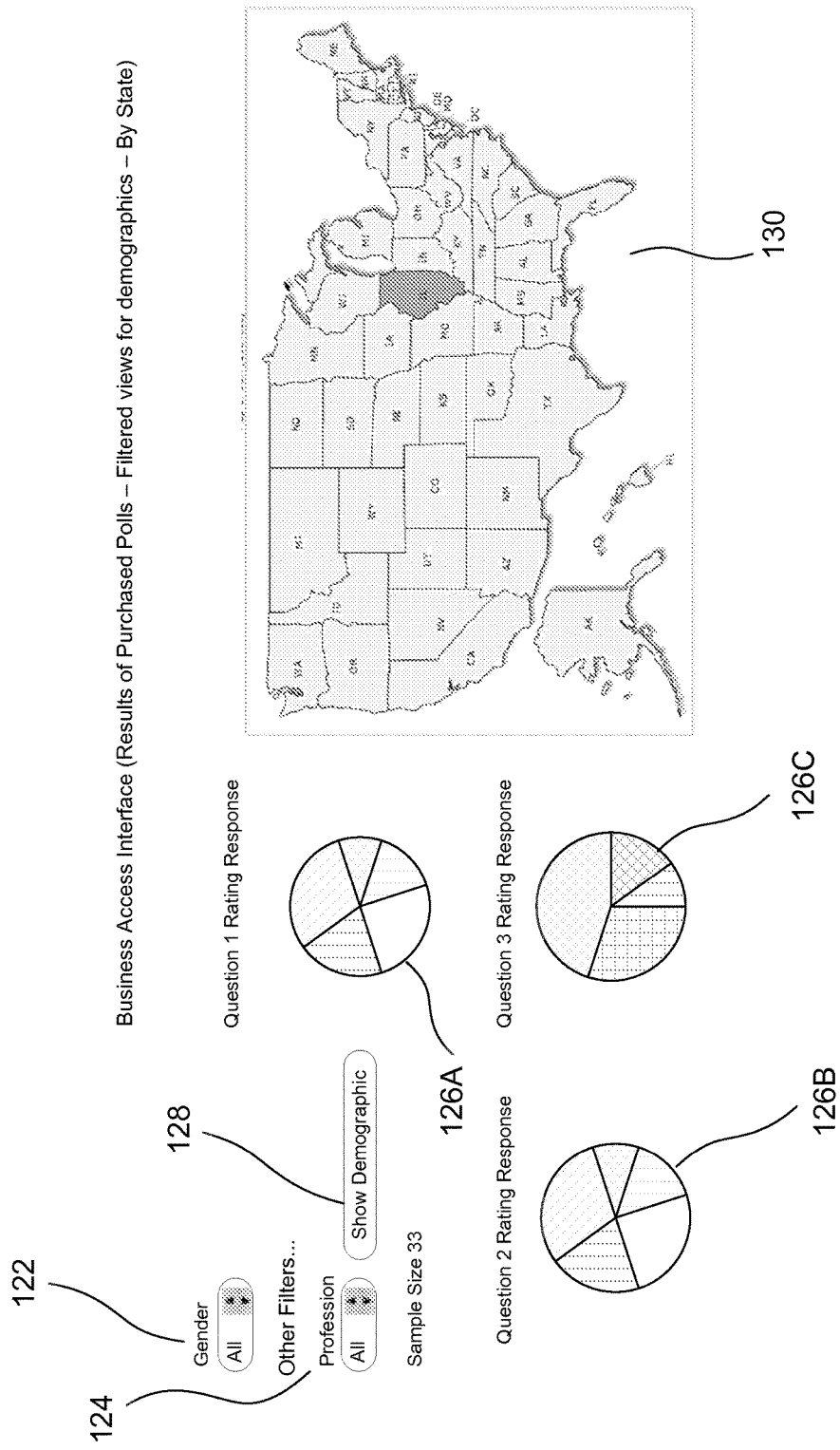
FIG. 4 is a plan view of a first user interface screen suitable for presenting and permitting filtering of survey data and demographic data to a sponsor company.
Figure 5:
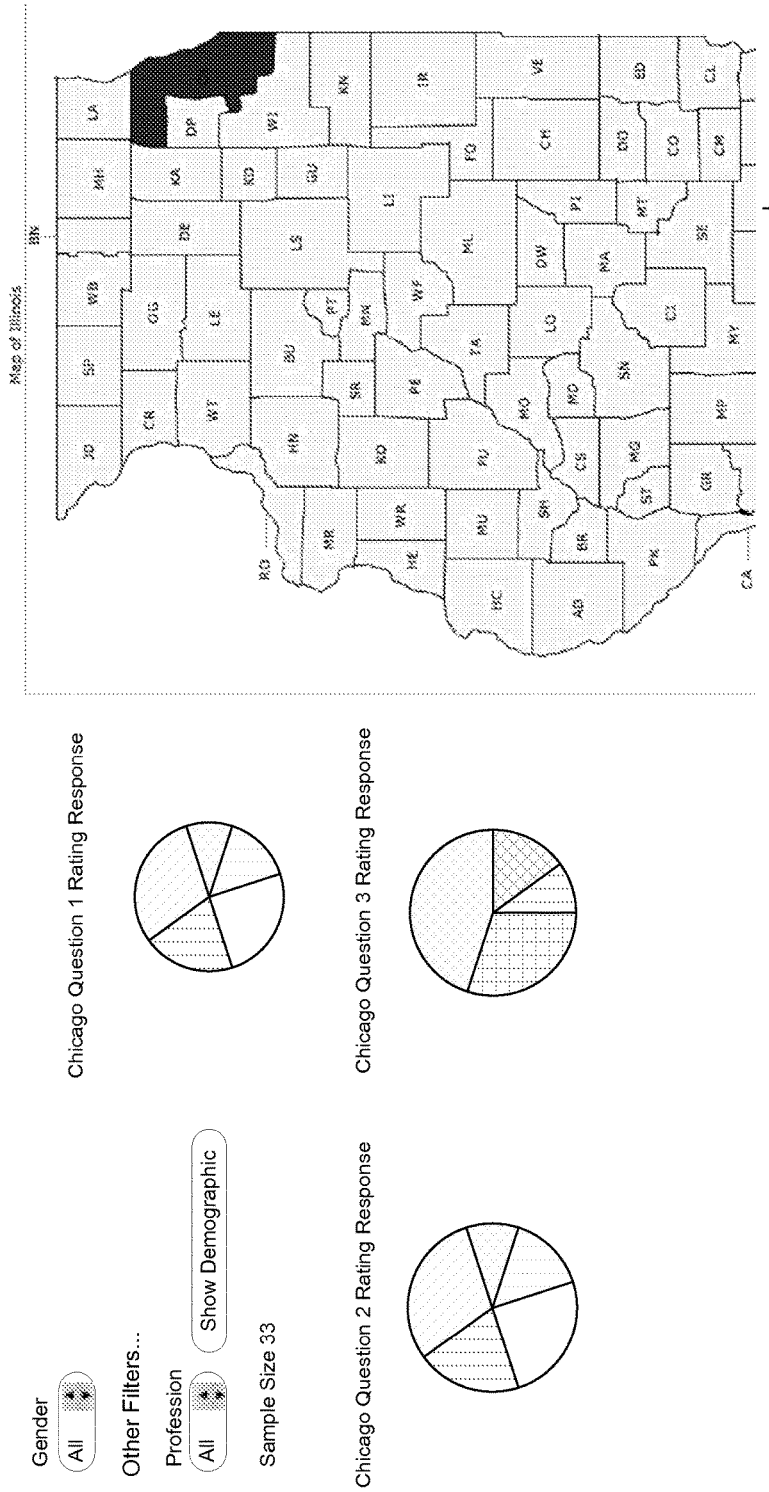
FIG. 5 is a plan view of a second user interface screen suitable for presenting and permitting filtering of survey data and demographic data to a sponsor company.

FIG. 4 illustrates a second screen in a user interface for accessing and querying database 40. This screen displays portions of the survey data in different formats and provides ways for the user to filter survey data by demographic. FIG. 4 includes three pie charts 126A-C that illustrate the relative number of passengers that selected a 1, 2, 3, 4, or 5 rating in response to Questions 1, 2, and 3. Pull down menus 122 and 124 permit a user to further filter the responses by gender and/or profession. In order to filter survey results by demographic, a user would first select the desired gender demographic, e.g. all, male, or female, and the desired profession demographic, e.g. doctor, lawyer, real estate agent, etc., from the pull down menus 122 and 124, and then the user would select the "Show Demographics" button 128. A selectable map 130 is also displayed in FIG. 4. A user desiring demographic information based on passenger's residency, may select a state, such as Illinois, from map 130. Selecting the state of Illinois from map 130 would result in a new screen or window to display a map of Illinois 132, as shown in FIG. 5. FIGS. 3-5 illustrate preferred embodiments of the user interface accessing information in database 40 and ways to filter survey data therein by demographic. Of course, variations on the user interface and the demographic used to filter the survey data are contemplated and within the scope of the invention.

Figure 6:
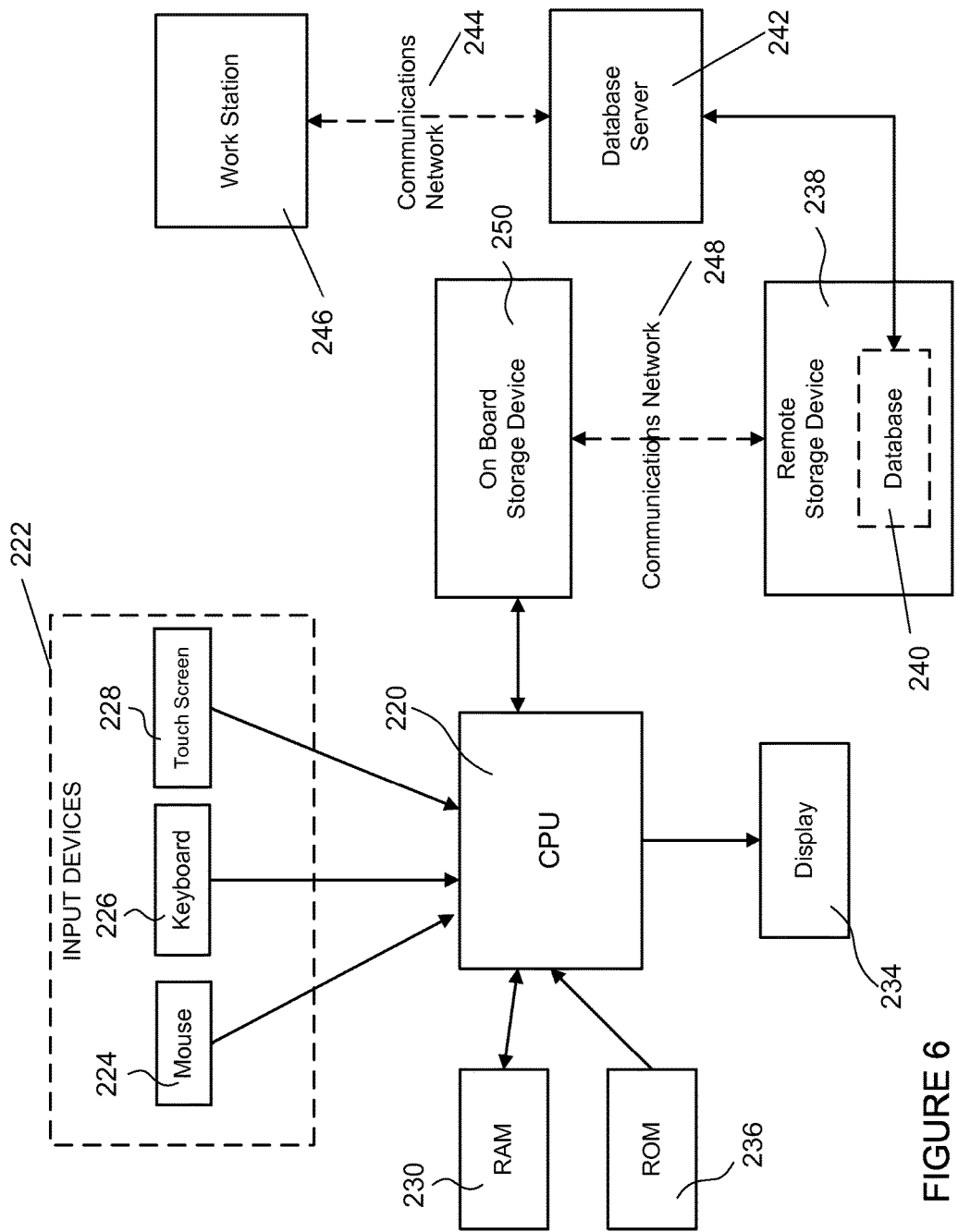
FIG. 6 is an schematic block diagram of the hardware for an alternative embodiment of the system for conducting market research.

FIG. 6 illustrates an alternative embodiment of the novel system utilized for conducting market research on an airplane. Central processing unit (CPU) 220 is a microprocessor adapted to accept inputs from a variety of hardware components. Again, the microprocessor and hardware components are well-known and commercially available. Random access memory (RAM) 230 and read only memory 232 (ROM) are provided to support the CPU 220 and its operations. One or more input devices 222 are also provided. The input device 222 may be a mouse 224, keyboard 226, or a touch screen 228. The keyboard or mouse may be omitted in certain embodiments where a touch-screen is used as the input device. Other input devices, such as a keypad or remote control, would also be suitable for use in the invention.

One or more displays 234 are operatively connected to the CPU 220. The display is preferably a touch screen display mounted in a passenger seat, but the display may additionally be a computer monitor, LCD, or television screen. In a preferred embodiment, each passenger seat is equipped with a display and input device, and most preferably, a touch screen display device. Where a touch screen display device is utilized a touch keyboard interface thereon can be utilized for entering alphanumeric characters, as shown in FIG. 2A. Display 234 utilizes a graphical user interface to allow users to fill out a survey. The graphic user interface illustrated in FIGS. 2, 2A, and 2B and previously described may be utilized.

In an alternative embodiment of the system depicted in FIG. 6, CPU 220 is operatively connected to a storage device 238 located on-board the aircraft. The on-board storage device 238 may be a hard drive or other high volume storage medium. Storage device 238 is used to store data corresponding to a passenger's answers to one or more survey questions in the manner previously explained. When a user selects a survey answer, the input device sends a signal to CPU 220 which interprets the signal and directs the storage device 238 to store the passenger's answer to survey question. Storage device 238 may additionally store demographic information relating to a passenger. Data stored on said local storage device may be transmitted over a communications network 248 to a remote storage device 238 following each flight, daily, or other specified time period. Regularly transferring data from an on-board storage device to a remote storage device will permit a smaller capacity and likely lighter storage device to be utilized in an aircraft, thus minimizing the weight on the aircraft which affects fuel consumption. The remote storage device storage device 238 may be a hard drive or other high volume storage medium. Preferably, demographic information and passenger survey answer data are stored in a database 240 on the remote storage device 238. Again, conventional database software such Microsoft Access, Microsoft SQL, PostgreSQL, dBase, MySQL, etc. may be used in forming the database.

As shown in FIG. 6, a database server 242 is operatively connected to the remote storage device 238 and database 240 contained therein. The database server 242 is preferably located remotely from said airplane. The database 242 server facilitates access to database 240 containing survey via a communications network 244, such as a radio, telephone, or wireless network link, naturally including the Internet, in the manner previously described with respect to the embodiment illustrated in FIG. 1. While FIG. 6 shows a single database 240 and single database server 242, multiple databases and database servers may be utilized if user account information and demographic information is segregated from passenger answer data.

Figure 2B:
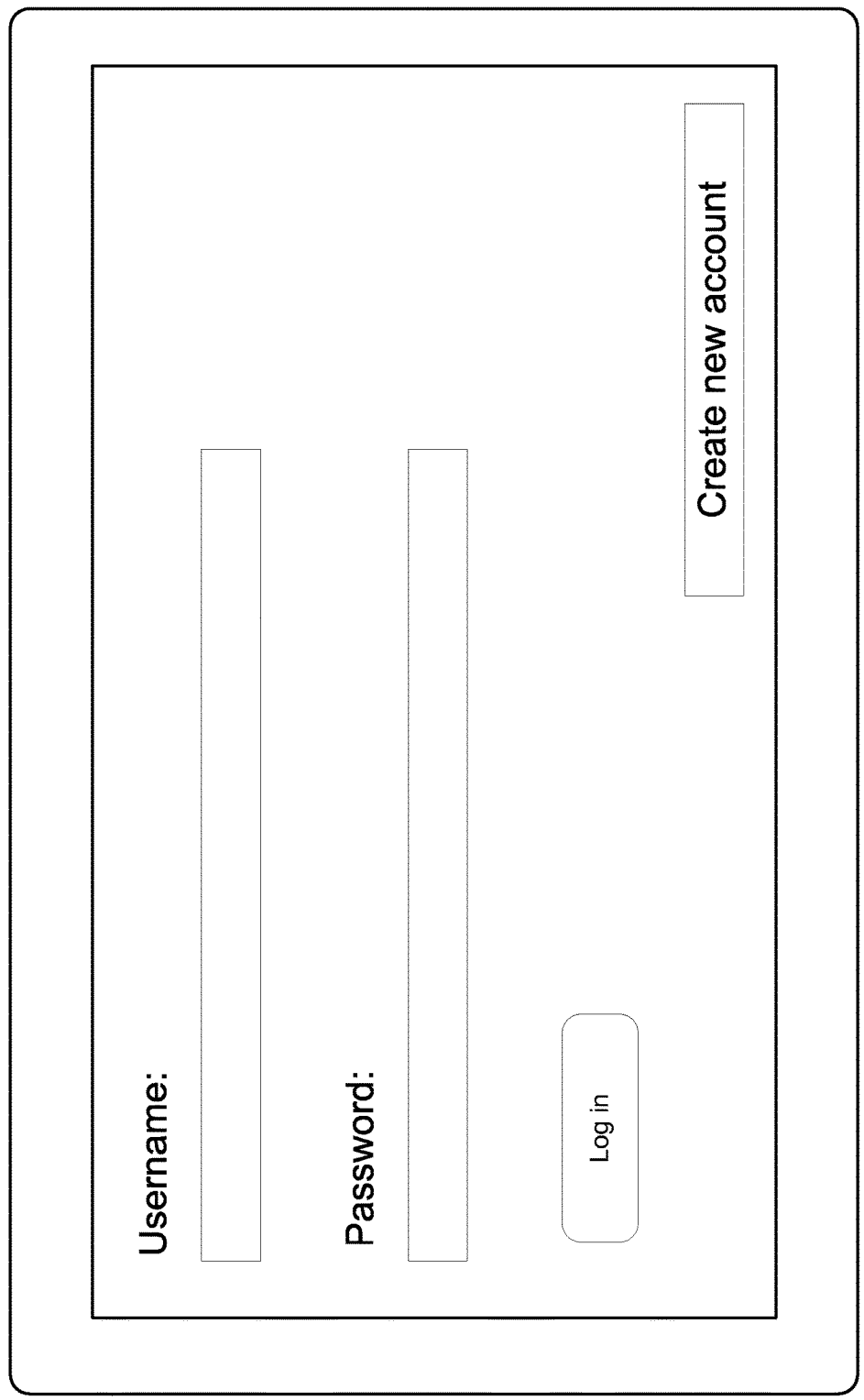
FIG. 2B is a plan view of a graphical user interface screen suitable for displaying a log in screen.
Figure 7:
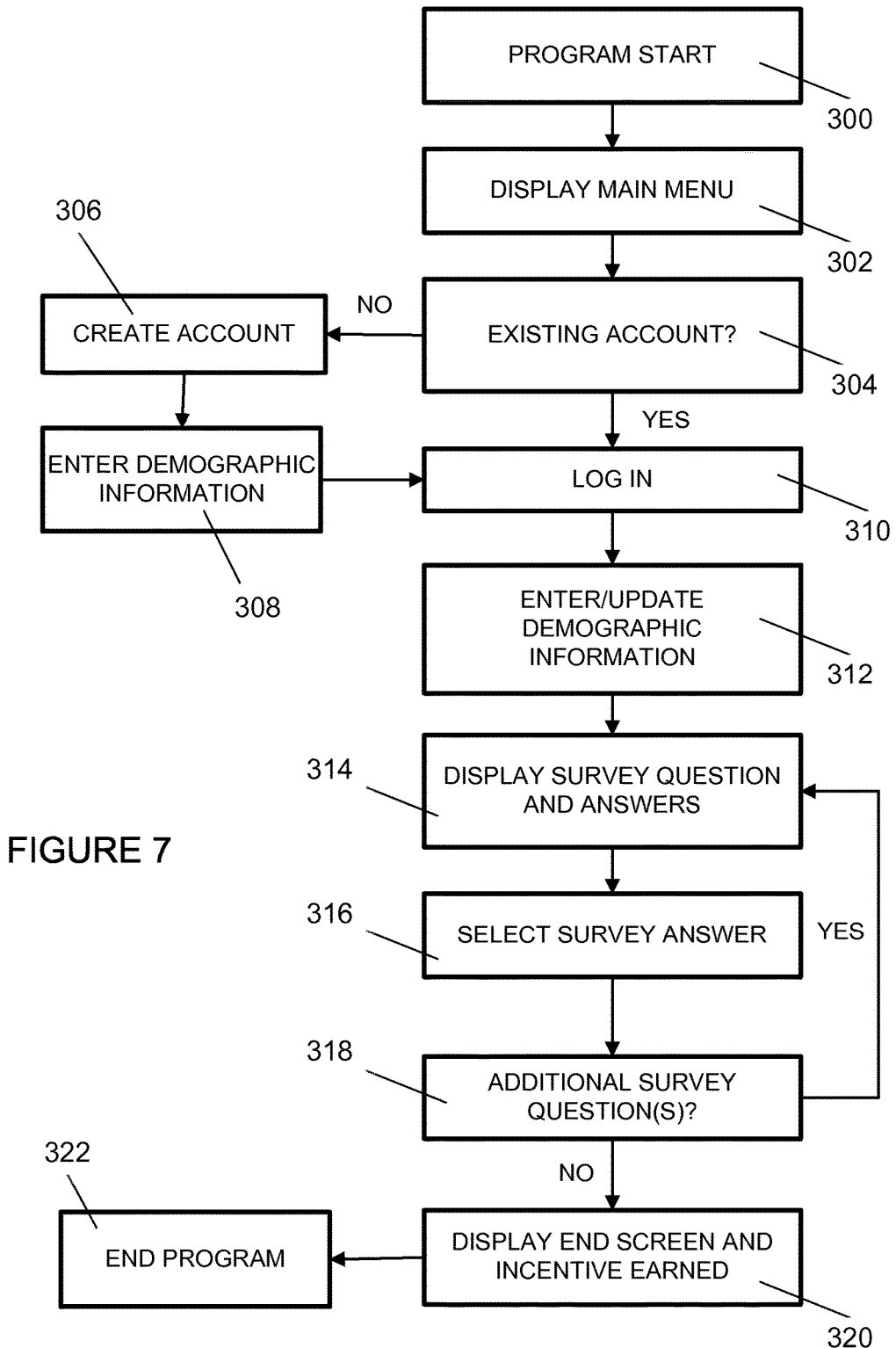
FIG. 7 is process flow diagram for an exemplary method for conducting market research.

FIG. 7 depicts a general schematic flow diagram illustrating a control data path for the method and system. The user initializes the program in a program start step 300. The airline may limit access to surveys so that they are available only during flight. A main menu screen, not shown, is displayed 302. Any acceptable main menu screen may be used. The main menu screen prompts the user to log in to an account in step 304. A login interface is depicted in FIG. 2B. If the passenger does not have an existing account, the user is prompted to create an account 306. A passenger creating a new account may then enter demographic data or other information as shown in step 308. Preferably, the log in step 310 requires a user to enter a password. After the passenger successfully logs in, step 310, the passenger is prompted to update demographic information or enter new demographic information not previously collected. An important aspect of the invention is collecting survey data cross-referenced by demographic data. Thus, it is important that demographic information be periodically updated, for example, if a passenger has moved or had a career change.

Referring still to FIG. 7, one or more survey questions and corresponding selectable answer choices are displayed in step 314. A suitable question/answer screen is shown in the graphical user interface FIG. 2. Any suitable question/answer screen may be utilized. The passenger next selects an answer to the displayed survey question or questions, as shown in step 316. The passenger's answer to a question is preferably automatically saved. As shown in FIG. 2, questions are preferably displayed one or two at a time and the graphical user interface includes a selectable "Next Question" button, 56. Selecting the "Next Question" button 56 generates a different question/answer screen, step 318. In another embodiment, the "Next Question" button is omitted and the system automatically determines in step 318 whether additional survey questions remain.

Survey questions may be presented to users in any order, as randomization of question order may be an important criteria of the survey design. Additional survey questions may vary from passenger to passenger depending on the answer a passenger provides for a particular question. For example, answering a particular question "NO" may result in other survey questions not being presented, or may prompt additional survey questions. Alternatively, passengers with certain demographics may be asked additional questions, for example, males may be asked certain questions that female passengers are not. Another feature of the invention is the implementation of safeguards that identify potentially suspect survey results, such as a timer or counter that would allow for identification of passengers who too rapidly answered survey questions.

Once a passenger has completed the survey, an end screen, not shown, is displayed 320. The end screen may alternatively be displayed if a user decides to exit a survey prior to its completion. Preferably, the end screen permits a passenger to review his or her survey answers, confirm the answers are correct, and/or change any previously entered answer. The end screen also preferably informs the passenger of the incentive earned for participating in the survey. The incentive awarded to a passenger who completes the survey should preferably be greater than the incentive awarded to a passenger that completes only a portion of the survey. In one embodiment, the passenger is presented a choice of incentives and permitted to select the incentive desired by the passenger. While not shown in FIG. 7, the passenger may select other buttons or icons displayed on the graphical user interface, such as the "Main Menu" button 62, "Extended Instruction" button 60, or "More about this Survey" button 58, at any time after a successful log in.

Figure 8:
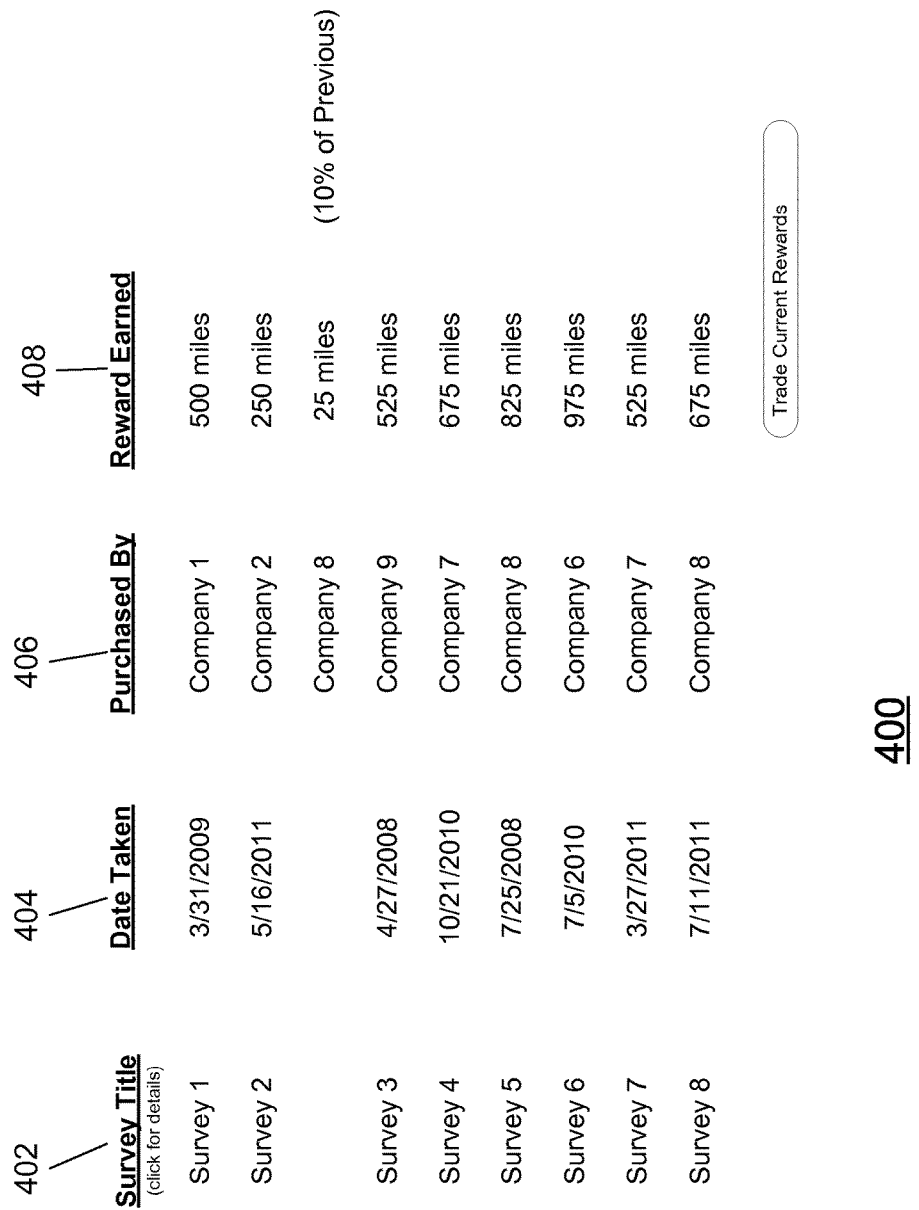
FIG. 8 is a plan view of a first user interface screen suitable for presenting survey response information to passengers.

In one embodiment of the invention, a user is able to access via the graphical user interface a history of surveys completed and other information, such as the survey title, date the survey was complete, who the survey was purchased by, and the incentive earned for each survey. An exemplar screen 400 that may be implemented and displayed via the graphical user interface is shown in FIG. 8. FIG. 8 includes a column of information for "Survey Title" 402, "Date Taken" 404, "Purchased By" 406, and "Reward Earned" 408.

Aspects of the invention also relate to novel methods for conducting market research, product research, or advertising research on an airplane. For example, a sponsor company may desire a nation wide soft launch of a new beverage product, such as a soft drink, juice, energy drinks, tea, beer, coffee, wine, liqueur, cordial, or other alcoholic beverage. Because airlines have long served beverages to passengers on airplanes, beverage products are particularly suitable for use in the product research method of the invention. The invention is, however, not limited to market research related to beverages. Other food products may also be suitable for use in conducting product research on an airplane, including candy bars, cookies, crackers, cheese, sausages, granola bars, chips, pretzels, and other salty snacks. Preferably, the product desired to be tested is provided in individually packaged servings to ease distribution of the product by flight attendants. In addition to beverage or food products, other consumer products may be suitable for product testing on an airplane, including soaps or lotions provided in airplane lavatories, paper products such as napkins, facial tissue, hand wipes, and toilet paper, newspapers, magazines, pillows, blankets, etc.

The method of the claimed system would include a process by which a company may propose products to the airline about which the company desires feedback. The company would provide the airline with samples of the product and any additional information desired about the product, such as product size, weight, packaging, and an ingredient list, if applicable. The airline would determine whether the product is appropriate for dissemination to passengers. The airline may reject the product proposal if the product contains a known allergen, such as peanuts, if the packaging is unsuitable to withstand the rigors of flight, or if the product name is offensive. Assuming a proposed product is acceptable for dissemination on an aircraft, a date range and location is established for the promotion, and arrangements are made for providing the test product to the airline in the necessary quantities for the product research project.

The company would also provide proposed survey questions and answers to the airline for review. If the product and survey are acceptable to the airline, the survey questions would be presented to participating passengers on a display containing a graphical user interface, such as the one illustrated in FIG. 2. Preferably, the airline provides software tools, such as a developer kit, that would permit a company to design a survey readily adaptable for use in a graphical user interface. Doing so would minimize the airlines cost for providing research on an aircraft. Data collected from passengers such as survey answer data and demographic data may be collected and stored using any of the embodiments of the system described herein. Similarly, the sponsor company may be provided access to the collected data using any of the embodiments of the system described herein.

Another aspect of the invention is a method of determining the price to charge companies for conducting research on an airplane. For example, if a packaged food product is accepted by an airline for in flight research, the cost for the extra weight generated by the product may be determined. Calculations are then made to determine the additional fuel costs associated with transporting the product to be tested. The sponsor company may be charged the differential fuel cost to offset increased operational costs and an optional surcharge may also be charged. In some instances, the product being tested may replace the snack or beverage that an airline provides free of charge to passengers, generating cost savings to the airlines.

Optionally or in addition, the sponsor company may be charged fees for accessing the data collected by the airline. A sponsor company may be charged additional fees for real time access to survey data. In another embodiment, a data package is presented to a sponsor company incrementally or at the end of the promotion. Cost for the data may be determined by demographic and/or how refined the sponsor company desired to filter the survey data. Referring to FIG. 3, the user interface may display columns of data arranged by demographic and the user may be provided access to certain demographic data, such as "Date" 100, "Gender" 102, and "Age" 104, for one price and be charged additional for accessing other columns of data, such as the "Profession" 120. Thus, data that only includes females 25-34 may cost 10% of the operational cost of a given flight the launch is on board. Where as the entire data set as outlined above could potentially cost 75-80% or more of the operational cost of the flight. Charging extra for the data may not necessarily be required. If the cost of running the promotion is significantly large and/or provides a core product for the trip the data fee may be waved.

In order to reward a passenger an incentive for participating in, or completing, a survey, the system includes a way for a passenger to create an account. In addition to the manner described in conjunction with FIG. 7, an airline's existing website, or a website created by an intermediary, may be utilized to present a graphical user interface through which individuals may create an account, log in, and enter demographic or other information prior to a flight. If an aircraft is equipped with WiFi capability, a user may create an account in flight via an airline's website or a website presenting the survey user interface. Where an airplane has WiFi capability, a passenger's personal computer may be utilized.

In addition to demographic information, additional data may be collected by the airline using the novel system and methods of the invention to improve operations. This information may include but is not limited to: food/beverage/alcohol preferences, seat preference (e.g. aisle, window, middle), flight time preferences, reason for flying, whether the passenger travels with animals, luggage type (e.g. duffle, garment, strollers), number of bags checked, luggage weight, average check in time, trip duration, etc.

Another feature of the invention is the display of one or more screens that permits a passenger to access information relating to surveys the passenger completed, incentives earned by the passenger for completing surveys, who has purchased their survey answers, and a sample data set matching what is presented to a sponsor company. Preferably, this information is accessible from a graphic user interface, and most preferably from the same interface that permits the user to enter or update demographic information. This information may be presented on a web based application, such as an airline website, where the user may maintain account information and update demographic information. Alternatively, this information may be presented on a display within an aircraft, such as a touch screen mounted in a passenger seat.

While the invention has been described in detail in terms of specific examples including presently preferred modes of carrying out the invention, those skilled in the art will appreciate that there are numerous variations and permutations of the above described systems and methods.

For example, much of the description of the preferred and alternate embodiments of the invention has focused on systems and methods for conducting product research. The novel methods and systems of the invention may be used to conduct polls, marketing research, and advertising. For example, an airline may show an advertisement on a display in flight. Passengers may provide feedback to the advertisement and its effectiveness by completing a survey. Similarly, an opinion poll may be presented to passengers and passengers may answer the poll utilizing the systems described above. These variations, and others, are to be considered in all respects only as illustrative and not restrictive.

What is claimed is:

1. An automated system for collecting market research on an airplane comprising:
    a display mounted in an airline seat within an airplane, said display containing a graphical user interface having a plurality of selectable screens wherein at least one of said selectable screens includes a survey question regarding a consumable product and a selectable icon corresponding to an answer to said survey question, said survey question displayed without using a moderator:
    a touch screen input device for inputting answer data corresponding to an airplane passenger's answer to said survey question;
    a storage device for storing said answer data, said storage device storing said answer data in a database, said database further storing said answer data in association with demographic data relating to an airplane passenger;
    a database server operatively connected to said storage device, said database server connected to a communications network whereby authorized users may access at least a portion of said answer data and said demographic data,
    in which said database server is accessible by an authorized user via a web browser configured to generate a second user interface, said second user interface displaying survey answer data,
    in which said web browser is further configured to display in said second user interface at least one selectable icon corresponding to at least one demographic,
    in which said web browser is further configured to (i) send a message over said communication network to said database server in response to selection by an authorized user of one or more demographic icons; said message including a database query command that specifies a query of said database for survey answer data matching the selected demographic, and (ii) display a web page including results of said query.

2. The system of claim 1 in which information regarding said consumable product is shown on said display.

3. The system of claim 2 wherein at least one said survey question relates to said product.

4. A computer implemented method of conducting market research on an airplane comprising the steps of:
    displaying a survey at a computer system comprising a processor, a display mounted in an airline seat, and an input device, said display having a graphical user interface and a plurality of selectable screens, at least one of said selectable screens including at least one survey question relating to a consumable product, said selectable screen further including a plurality of selectable icons corresponding to predetermined answers to said survey question, wherein said survey is displayed without using a moderator;
    establishing a first data link between an input device and an on-board server; utilizing said first data link to transmit data input by a passenger via said input device to said on-board server, said data containing a passenger's answer to at least one survey question;
    storing said passenger answer data in a first storage device operatively connected to said on-board server;
    awarding said passenger an incentive for completing the survey;
    storing demographic information relating to an airline passenger in an offsite data storage device;
    establishing a second data link between said first storage device and said offsite data storage device;
    transmitting said passenger answer data over said second data link and storing said passenger answer data in said offsite data storage device, said passenger answer data stored associated with said demographic information in a database in said offsite data storage device; and
    providing access to at least a portion of said passenger answer data and demographic information in said offsite data storage device to a product sponsor.

5. The method of claim 4 further comprising the step of accessing said database via a web browser configured to generate a second user interface, said second user interface including selectable icons corresponding to at least one demographic.

6. The method of claim 4 further comprising the steps of selecting said selectable icon and displaying a webpage containing survey answer data matching the selected demographic.

7. An automated system for collecting market research on an airplane comprising:
    a display mounted in an airline seat within an airplane, said display containing a graphical user interface having a plurality of selectable screens wherein at least one of said selectable screens includes a survey question regarding a consumable product and a selectable icon corresponding to an answer to said survey question, said survey question displayed without using a moderator:

a touch screen input device for inputting answer data corresponding to an airplane passenger's answer to said survey question;

a storage device for storing said answer data, said storage device storing said answer data in a database, said database further storing said answer data in association with demographic data relating to an airplane passenger;

a database server operatively connected to said storage device, said database server connected to a communications network whereby authorized users may access at least a portion of said answer data and said demographic data, in which said database server is accessible by an authorized user via a web browser configured to generate a second user interface, said second user interface displaying survey answer data, and in which said web browser is further configured to display in said second user interface at least one selectable icon corresponding to at least one demographic.

* * * * *